United States Patent
Prasad et al.

(10) Patent No.: US 11,899,662 B1
(45) Date of Patent: Feb. 13, 2024

(54) COMPRESSION AWARE AGGREGATIONS FOR QUERIES WITH EXPRESSIONS

(71) Applicant: Teradata US, Inc., San Diego, CA (US)

(72) Inventors: Snigdha Prasad, Hyderabad (IN); Nobul Reddy Goli, Hyderabad (IN); Injamuri Krutika, Hyderabad (IN)

(73) Assignee: Teradata US, Inc., San Diego, CA (US)

(*) Notice: Subject to any disclaimer, the term of this patent is extended or adjusted under 35 U.S.C. 154(b) by 0 days.

(21) Appl. No.: 18/085,937

(22) Filed: Dec. 21, 2022

(51) Int. Cl.
*G06F 16/2453* (2019.01)
*G06F 16/2455* (2019.01)
*G06F 16/22* (2019.01)

(52) U.S. Cl.
CPC ...... *G06F 16/24537* (2019.01); *G06F 16/221* (2019.01); *G06F 16/24561* (2019.01)

(58) Field of Classification Search
CPC ......... G06F 16/24537; G06F 16/24561; G06F 16/221
USPC .......................................................... 707/693
See application file for complete search history.

(56) References Cited

U.S. PATENT DOCUMENTS

| | | | | |
|---|---|---|---|---|
| 10,997,173 | B2 * | 5/2021 | Chen ................ | G06F 16/24544 |
| 2010/0088315 | A1 * | 4/2010 | Netz ................ | G06F 16/24561 |
| | | | | 707/E17.014 |
| 2014/0195502 | A1 * | 7/2014 | Huang ................ | G06F 16/221 |
| | | | | 707/693 |
| 2021/0034598 | A1 * | 2/2021 | Arye ................ | G06F 16/288 |

OTHER PUBLICATIONS

"Features Supported in Centerprise Pushdown", www.astera.com, © 2019, 50 pages.*
Bansal, Rohit, et al., "Improve federated queries with predicate pushdown in Amazon Athena", AWS Big Data Blog, Oct. 11, 2022, downloaded from: aws.amazon.com/blogs/big-data/improve-federated queries-with-predicate-pushdown-in-amazon-athena/, pp. 1-12.*
Braams, Boudewijn, Predicate Pushdown in Parquet and Apache Spark, Master's Thesis, MSc Computer Science, Vrije University, Amsterdam, The Netherlands, Dec. 2018, 94 pages.*

(Continued)

*Primary Examiner* — Robert Stevens
(74) *Attorney, Agent, or Firm* — James Stover

(57) ABSTRACT

A system and method for extending compression-aware aggregation logic to column partitioned database sources when an SQL query involves simple or complex aggregate expressions. The logic can be applied when there are multiple fields specified in a Group By clause, when a Group By clause includes an expression involving multiple columns from a column partitioned table, or when there is no Group By clause in the query. This logic extends the benefits of push-down aggregation to complex aggregate queries to build partially aggregated rows that can be directly added into an intermediate cache. For cases where the fields within aggregate expressions are themselves compressed, the aggregation techniques leverage the compression information of the aggregate fields. This aggregation mechanism can be applicable to compression techniques including run-length encoding (RLE), value list compression (VLC) and Presence, Delta on Mean (PDM) on columnar source tables such as Column Partitioned (CP) or Parquet tables.

19 Claims, 11 Drawing Sheets

(56) References Cited

OTHER PUBLICATIONS

Gao, Huaxin, "Data Source V2 aggregate push down", Medium, Nov. 1, 2018, downloaded from: medium.com/@huaxingao/data-source[v2-aggregate-push-down-45152aa48ba9, pp. 1-9.*

* cited by examiner

COMPRESSION AWARE AGGREGATIONS FOR QUERIES WITH EXPRESSIONS

FIELD OF THE INVENTION

The present disclosure relates generally to processing queries against column-partitioned database tables, and more particularly to methods for extending aggregate push-down logic to column partitioned sources when an SQL query includes aggregation expressions that involve multiple columns or multiple grouping fields from a column partitioned table.

BACKGROUND OF THE INVENTION

A database is a collection of stored data that is logically related and that is accessible by one or more users or applications. A popular type of database system is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Some database tables may be capable of partitioning database tables by column and by row. This column-oriented storage model provides significant performance benefit to analytic queries that reference a small subset of columns from a table with many columns. For example, in column-oriented databases, simple aggregation functions used to summarize data in queries, such as AVG, COUNT, MIN, MAX and SUM functions, may be computed on-the-fly at the source of reading the column value. In other words, during processing of a query, the query, or parts of the query, may be "pushed down" into the connected data source. This means that a specific predicate, aggregation function, or other operation, is passed through to the underlying storage system for processing. The results of this push-down can include improved overall query performance, and reduced traffic between the processing nodes and the data sources. However, these "aggregate push-down" operations cannot be applied when the aggregates in a query select list or grouping field involves expressions, or when multiple grouping columns are involved in a Group-By clause.

The methods described below extend the benefits of push-down aggregation techniques to complex aggregation queries involving expressions, and cases where aggregate fields within aggregate expressions have been compressed.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Initially, it is noted that specific embodiments and sample implementations for various aspects of the invention are provided in detail the U.S. Provisional Application No. 62/246,653, which is incorporated by reference in its entirety herein.

Figure 1:
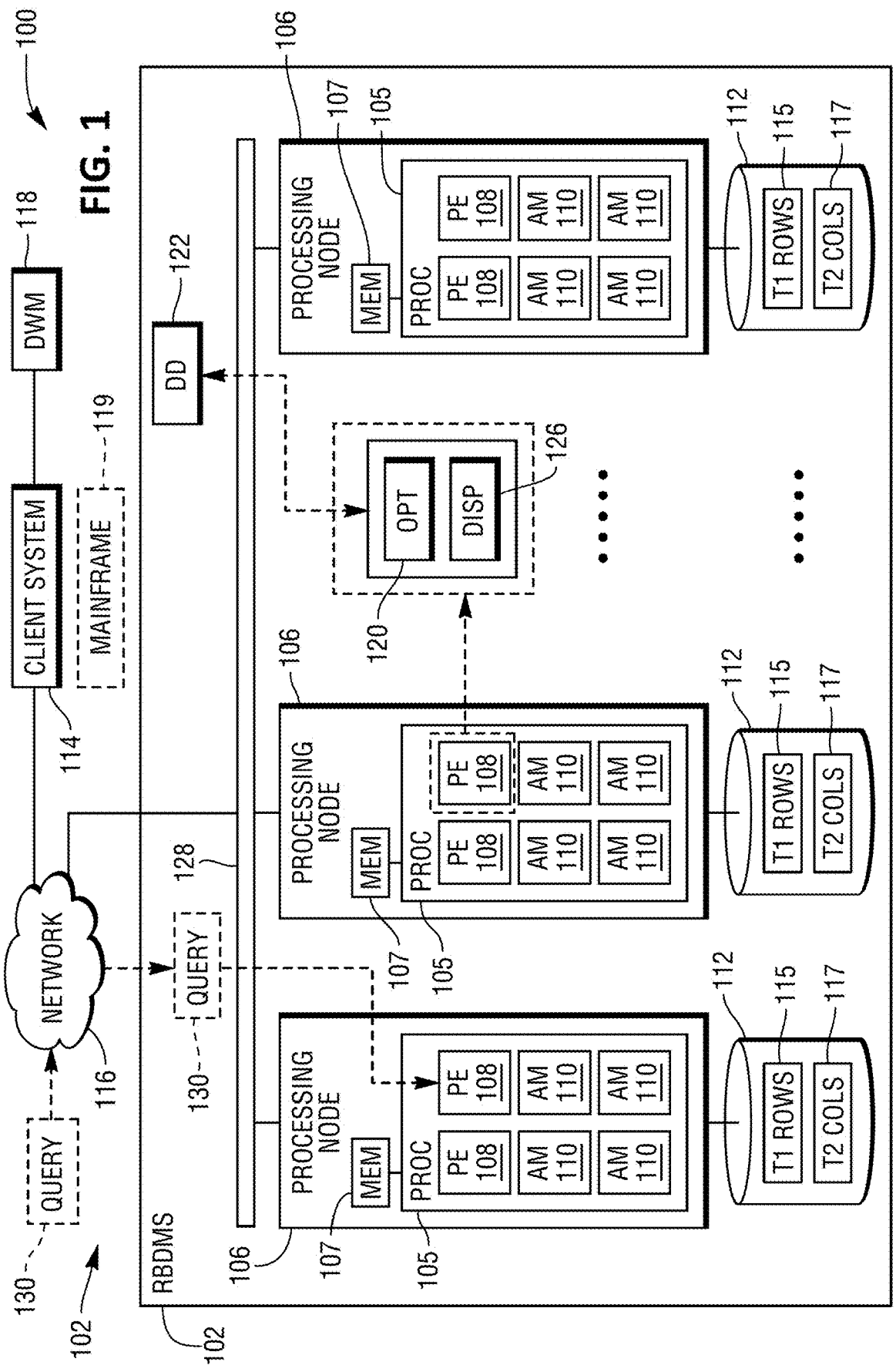
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, the database system 100 may be configured to distribute rows across access modules 110 and their associated DSFs 112 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to associated access modules 110 by a hash bucket map. The characteristics of the columns chosen for the primary index determine how evenly the rows are distributed. Alternatively, rows read from external sources may be randomly distributed to access modules 110 or, if internal sources, rows can be locally copied, randomly distributed, or hashed distributed to access modules 110.

For an access module 110, rows of each stored table may be stored DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may employ an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 2:
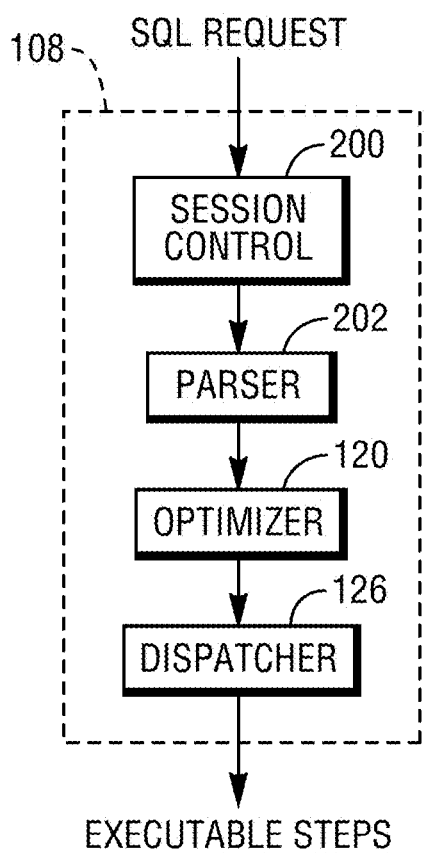
FIG. 2 is a block diagram of a parsing engine module 108 within the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
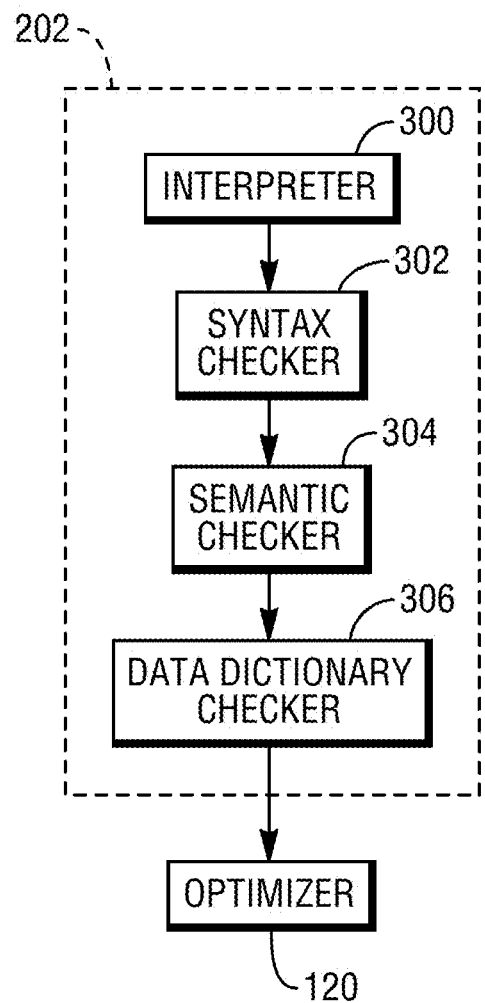
FIG. 3 is a block diagram of a parser module 202 within the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

During operation, a query, such as the query 130, or utility may require the database system 100 to perform a row-based operation. This requires relevant rows to be located by a file system and returned for subsequent processing. However, column-partitioning presents issues related to row-processing. As data tables are column-partitioned, partitioned columns of a row may be distributed throughout the DSFs 112 associated with the access module 110 that manages that row. Thus, rows are broken up into the column partitions. Such partitioning requires the access module 110 to spend time gathering each referenced column value of a row in order for the row to be processed.

Columns may be partitioned by the database system 100 and placed into physical storage, or "physical rows," of storage disks of the DSFs 112. In one example, the partitioned columns may be assigned a column partition number. Each column partition may include a number of container rows in which the column values are stored. The length and number of container rows is dependent upon the number of column values and the size of the column values. When column partitioning a database table, the partitions may vary in placement, such that more than one column may be part of a column partition. Each of the container rows of a column partition may include one or more column partition values. Each column partition value may represent one or a concatenation of more than one column value. During query processing, referenced column-partitioned column values need to be accessed. Thus, these column values may each be associated with an identifier so that the column values can be located when needed.

Figure 4:
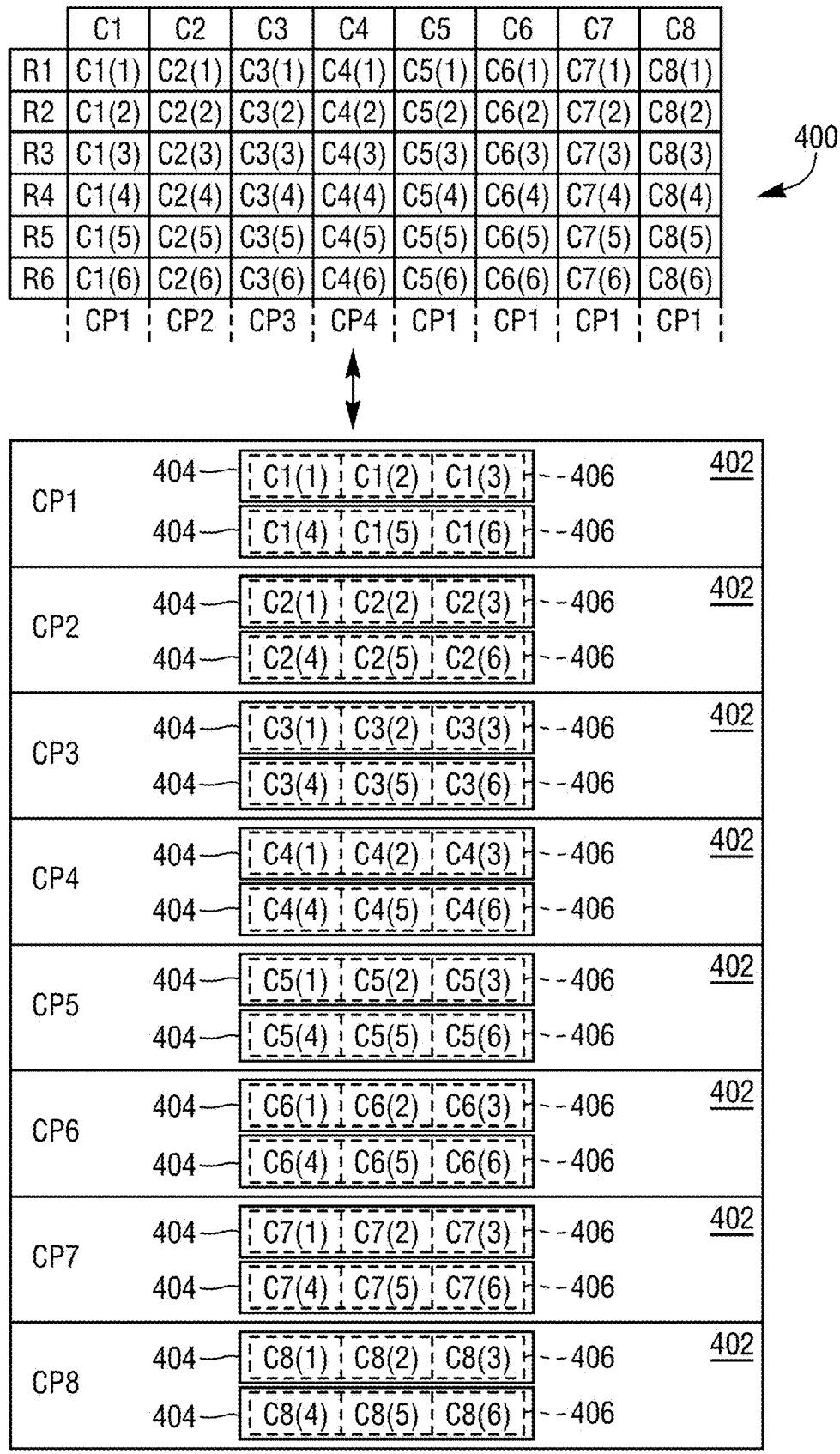
FIG. 4 is an example of column partitioning of a database table.

FIG. 4 shows an example of a table 400 being partitioned into a number of column partitions 402. Table 400 includes six rows, R1 through R6, eight columns C1 through C8. Each column is partitioned into a separate column partition 402. The partitioned column values may be placed into column container rows 404 within each column partition 402. Each container row 404 includes a number of column partition values 406. In FIG. 4, each column partition value 404 may represent one or more column values. In the example in FIG. 4, each column partition value 404 includes a single column entry. Each column partition value 404 may be associated with a unique identifier field referred to as a "rowid."

Aggregate Expression Push-Down to Columnar Sources

During processing of queries, the query, or parts of the query, may be "pushed down" into the connected data source. This means that a specific predicate, aggregation function, or other operation, is passed through to the underlying storage system for processing. The results of this push-down can include improved overall query performance, and reduced traffic between the processing nodes and the data sources.

In traditional push-down aggregation logic, aggregation can be pushed down to column partition sources when the query involves aggregate expressions referencing direct column values in select list and in Group By clauses. The aggregations can be computed on-the-fly at the data source when reading the column value to the extent of the run-length of the grouping column that is stored in compressed format with run-length encoding. However, traditional push-down techniques cannot be applied when the aggregates in the select list and/or the grouping fields involve expressions, or when multiple grouping columns are involved in Group By clauses. When multiple grouping columns are involved in a Group By clause, there is a need to compute a combined hash value for all the grouping columns to aggregate rows that match the hash value, requiring expression evaluation capabilities that are to be applied for each field independently.

In most database systems, there is a subsystem that evaluates the expressions using generated executable code that is involved in building an individual result row that is generated after evaluating all the expressions in select list and grouping columns. However, when evaluating expressions in this manner, traditional push-down logic cannot be applied to, and cannot leverage, the run-length encoding of the grouping columns while performing aggregation.

Figure 5:
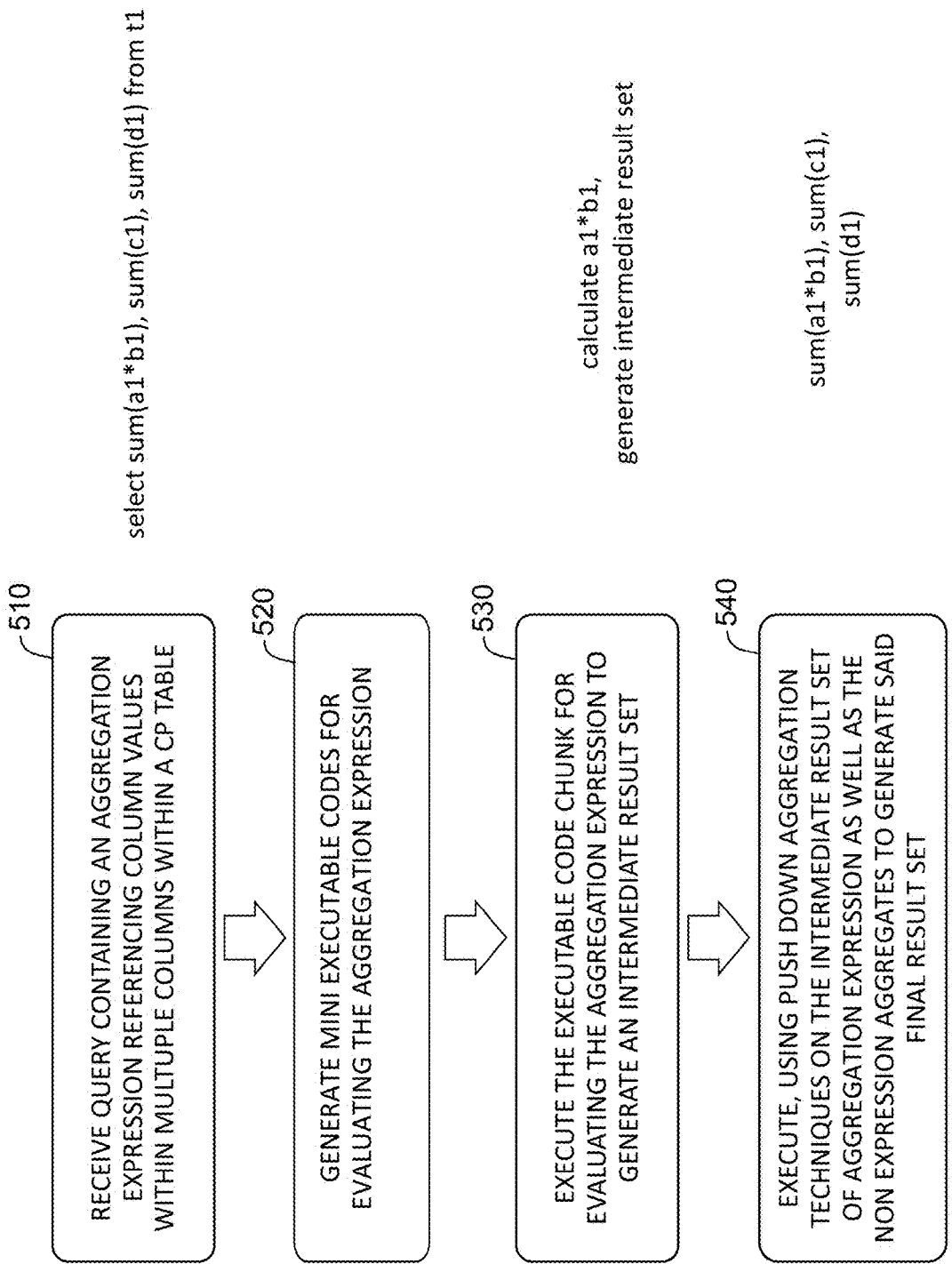
FIG. 5 is a flow diagram illustrating an improved method for executing complex aggregation queries involving expressions in accordance with the present invention.
Figure 6:
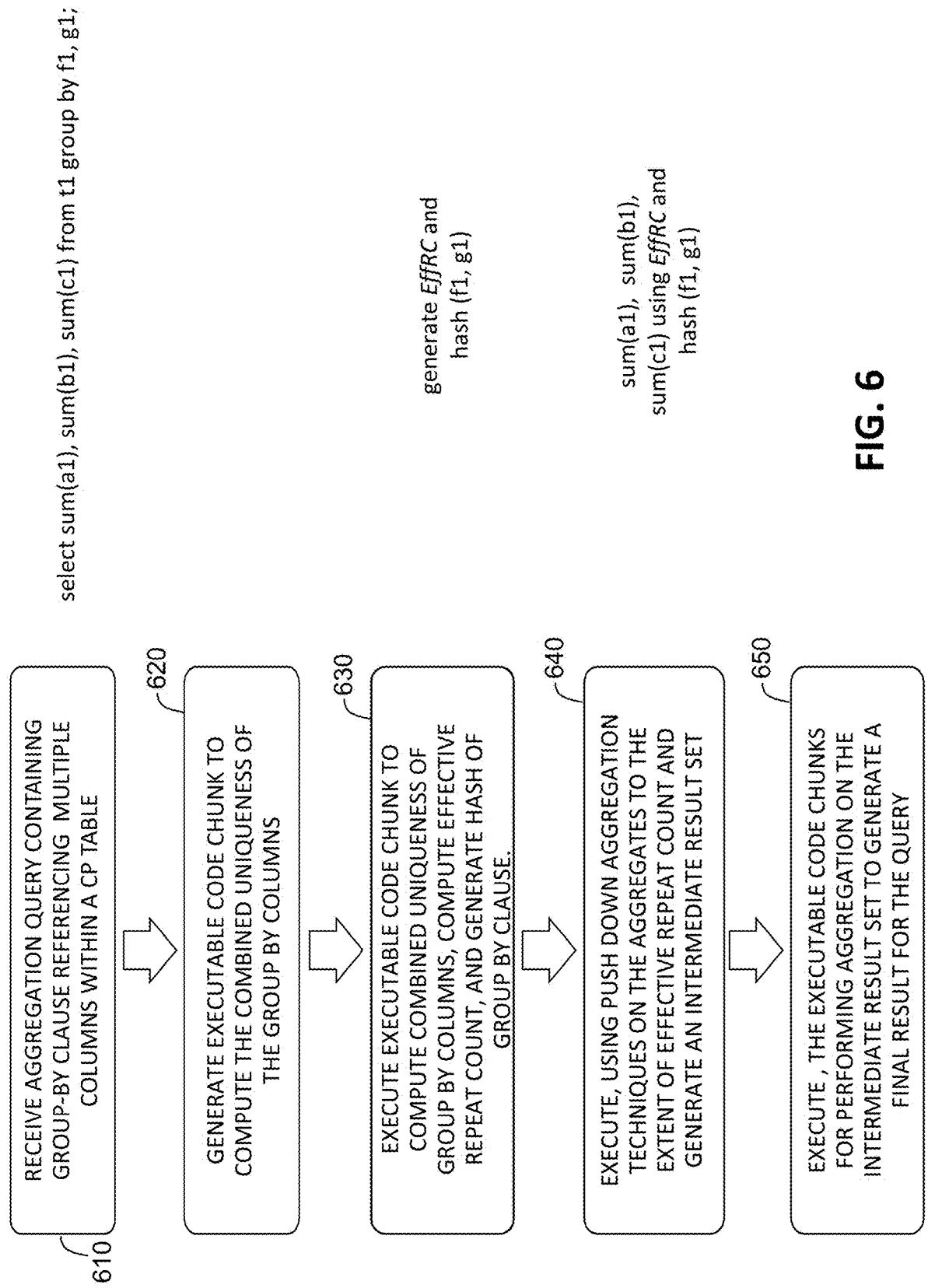
FIG. 6 is a flow diagram illustrating an improved method for executing complex aggregation queries including Group By clauses with references to multiple grouping columns in accordance with the present invention.

To employ a push-down approach for aggregation queries involving expressions, presented below is a method where the generated executable code is broken down into multiple chunks of executable code generated for each expression. This will enable executable code to be applied at the column partition level and perform push-down aggregation on the result generated after completion of an executable code chunk execution. This method can be applied to the following types of queries:

1. Aggregate queries with expressions in select list:
   a. Without Group By Clause:

select sum($a1*b1$),sum($c1$),sum($d1*e1$)from $t1$;

b. With Group By Clause when Group By field (here g1) are run-length encoded:

select sum($a1*b1$),sum($c1$),sum($d1*e1$)from $t1$ group by $g1$;

2. Queries containing reference to multiple fields in a grouping clause where each Group By field is run-length compressed:
   a. Multiple grouping fields together:

select sum($a1$),sum($b1$),sum($c1$)from $t1$ group by $f1,g1$;

b. Involving expression in grouping clause:

select sum(a1),sum(b1),sum(c1)from t1 group by f1+g1;

FIG. 5 and FIG. 6 illustrate the process for evaluating a query containing an expression aggregate in a select list (FIG. 5), and a query containing multiple grouping columns in a Group By clause (FIG. 6).

FIG. 5 illustrates the process for evaluating the simple query select sum(a1*b1), sum(c1), sum(d1) from t1, the first aggregation term of this query containing the expression a1*b1 for combining values read from columns a1 and b1 of column partitioned table t1. Following receipt of the query (step 510), the database system generates executable code chunks for evaluating the expression a1*b1 (step 520). In step 530, the executable code chunk for calculating a1*b1 is executed to read values from columns a1 and b1 and generate an intermediate result set containing the products of the values. In step 540, aggregations are performed against the this intermediate result set, column c1 and column d1 using push-down aggregation techniques to complete query execution.

The process for evaluating the query select sum(a1), sum(b1), sum(c1) from t1 group by f1, g1, is illustrated in FIG. 6. This query is executed to perform aggregations on columns a1, b1, and c1 of column partitioned table t1, and contains a Group By clause referencing multiple grouping columns f1 and g1. Following receipt of the query (step 610), the database system constructs executable code chunks for evaluating the grouping clause group by f1, g1. (step 620). In step 630, the executable code chunk for evaluating the grouping clause is executed to read values from grouping columns f1 and g1. An effective run-length (EffRC) for the two grouping columns is generated and their combined hash value is computed which is then used to perform grouping. In step 640, the aggregations are computed for column a1, b1 and c1 using push-down aggregation techniques to the extent of EffRC using same hash values generated in step 630 for EffRC number of rows. Depending on data organization within the column partition, multiple intermediate result sets may be produced for each unique grouping value. In step 650, the executable code chunk for performing aggregation is used to coalesce these multiple intermediate result sets generated by step 640 to complete query execution.

Compression Aware Aggregation for Queries with Expressions

The foregoing discussion presented methods where the generated executable code for aggregate queries containing expressions is broken down into multiple chunks of executable code generated for each contained expression. This will enable executable code to be applied at column partition level and perform push-down aggregation on results generated after completion of executable code chunks. In cases where the columns in the aggregates are also compressed, the methods presented below may be employed to leverage the column compression information during aggregate computations to further improve query performance. Below are two categories of aggregate queries wherein query performance can be improved with compression aware aggregation:
 1. Group By columns are compressed, and
 2. Aggregate columns are compressed in queries without Group By clauses or in queries with compressed Group By columns.

Group by Columns are Compressed:

When executing an aggregation query on a table that is column partitioned, and the query contains a Group By field which is run-length encoded, the aggregate operation can be pushed down to the data source by reading ahead the column values from multiple qualified rows to the extent of the run-length of the Group By column to build a partially aggregated row for that Grouping value.

Consider the following query on a table t1 that is column partitioned with each column in its own physical data block:

select sum(a1), sum(b1), sum(c1) from t1 group by d1;

For the above query, considering grouping column d1 is compressed with run-length encoding, the aggregate function can be pushed down to data source as the run-length value of the grouping column d1 can be known upfront before applying aggregates on columns a1, b1, c1. As these are simple fields the respective column partitions can be read for multiple values from different containers of each column before performing aggregate operation and producing the result that will go into the partially aggregated intermediate row. Applying push-down of aggregate function here can leverage the effective run-length of the grouping column and reduce the number of intermediate rows built and added into the aggregate cache.

Now consider the following query on the same table:

select sum(a1*b1), sum(c1), sum(e1*d1) from t1 group by c1,f1;

In the above query the aggregate function applied on the product of two column values, so the above push-down strategy cannot be applied to push the aggregation operation to the column partition sources. Before the aggregate functions can be applied, the functions a1*b1 and e1*d1 will need to be evaluated. As mentioned earlier, two, or more, separate executable code chunks are generated to build the intermediate row and then perform actual aggregate computation:
 1. An executable code chunk to evaluate the expressions and generate the intermediate row. This code chunk will read the values for all the columns referenced in the query and perform the expression evaluation for a1*b1 and e1*d1 and calculate the combined hash for grouping columns c1, f1.
 2. An executable code chunk to perform the aggregation on the results of a1*b1, c1, and e1*d1.

In cases such as the query discussed immediately above, there is a need to materialize the complete row before performing computations, push-down strategy cannot be leveraged, and partially aggregated rows are not built. To overcome this challenge, the executable code chunk to generate complete intermediate rows can be split into multiple executable code chunks that will only work on columns that are part of the expression which is participating in aggregation. These can be invoked independently, and the result can be aggregated with push-down strategy.

To elaborate on the above example, separate executable code chunks will be generated to evaluate each of the expressions a1*b1, e1*d1, and hash(c1,f1) that can be invoked independently of each other and then the aggregate operation will be performed as follows:
 1. First the effective run-length, referred to as EffRC) is calculated for the combined columns of c1, f1 and the hash is generated by invoking the mini executable code chunk. The generated hash is used to add the partially aggregated row into an aggregate cache. It is to be noted that the combined hash code is generated only once for given EffRC rows.

2. For each expression present in the select list of the query, the more specific executable code chunk that just works on the necessary columns is invoked to evaluate the expression, such as a1*b1 in this example, for EffRC number of times. and the evaluated results are aggregated.
3. As sum(c1) does not involve an expression, the aggregation can be applied (pushed) when reading the EffRC number of values of column c1.
4. Similarly, for expression e1*d1, steps 2 and 3 are repeated. This way the mini executable codes are invoked repeatedly for each expression, and resultant values are aggregated before moving on to next expression enabling push-down strategy to be applied.
5. Each aggregated value evaluated for the column/expression for given EffRC is then added to the aggregate intermediate row.
6. In the above example, if columns a1 and b1 are also compressed with effective run-length EffRC1, the execution of code chunk in step 2 above can be further reduced by the factor of EffRC1, as described below under the heading "Aggregate columns are compressed."

The method can be extended to scenarios utilizing in-memory buffers, where data is stored and processed in system memory, offering much faster processing times than systems and applications limited to processing data in non-volatile or persistent storages, e.g., Hard Disk Drives (HDDs), Solid State Disk Drives (SSDs), and Flash memory. By utilizing in-memory buffers, column values are read ahead, which will accelerate expression evaluation and calculation of the effective run-length when the in-memory buffers hold values from grouping columns.

Figure 7:
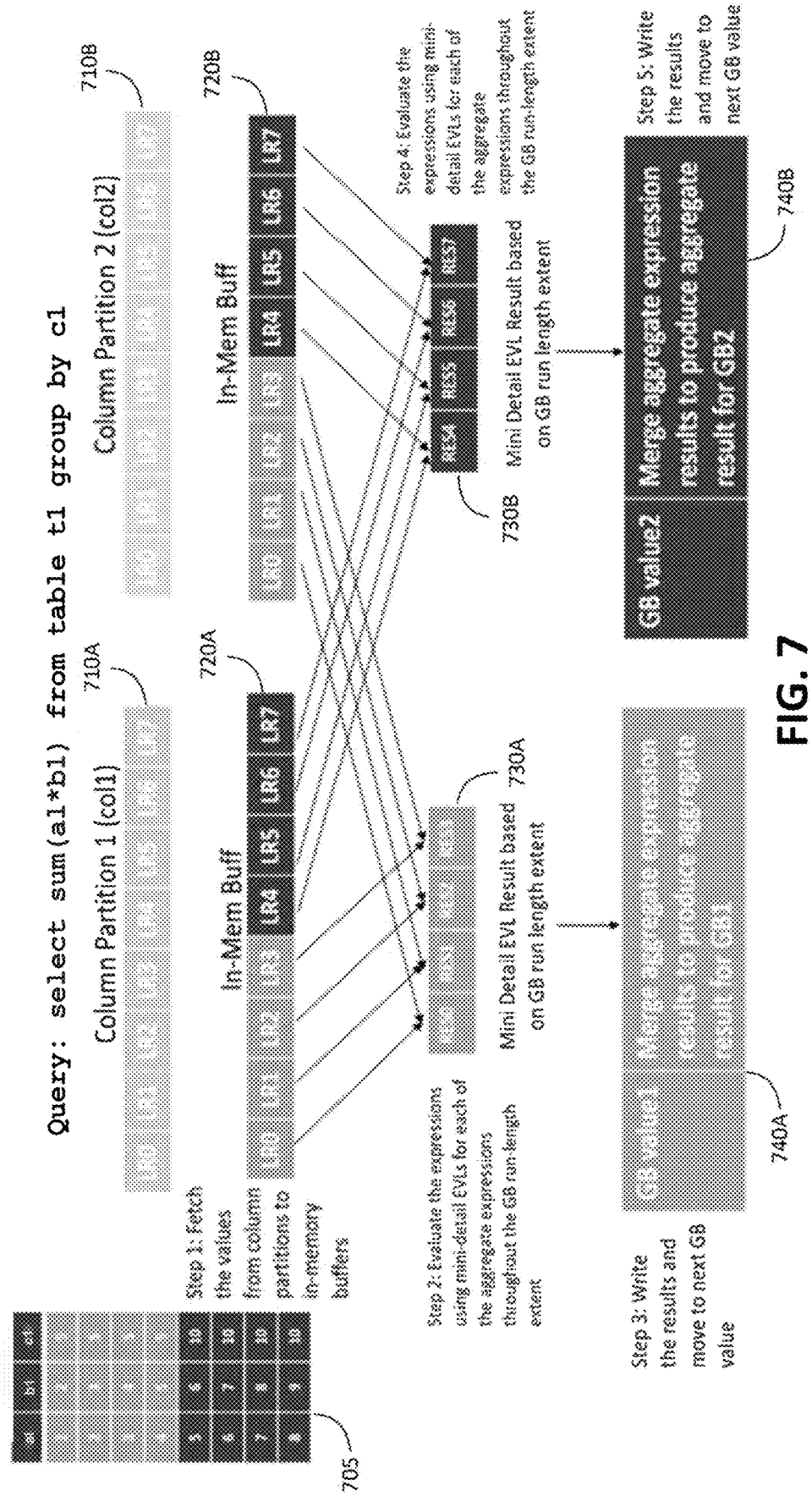
FIG. 7 illustrates the execution of an expression combining two table columns using an in-memory buffer.

FIG. 7 illustrates the use of an in-memory buffers to evaluate the expression a1*b1 contained within the query select sum(a1*b1) from t1 group by c1. In the simple example illustrated, table t1, identified by reference numeral 805, contains three columns, a1, b1, and c1, and eight rows of values, the rows identified as LR0 through LR7. Column partitions a1 and b1 are also shown by reference numerals 710A and 710B, respectively. The group-by column c/contains two values, the value of "5" in the first four rows LR0 through LR3, and the value "10" in the last four rows LR4 through LR7. This first group-by value is also referred to as GB1, the second group-by value as GB2. The values contained within columns a1 and b1 are first fetched from table t1 to populate in-memory buffers 720A and 720B, respectively. The first four values from buffers 720A and 720B associated with the GB1 are combined to produce a result set 740A, and the last four values from buffers 720A and 720B associated with the GB2 are combined to produce a result set 740B. The values contained in result sets 740A and 740B can be aggregated using push-down techniques to produce aggregate results for GB1 and GB2, identified with reference numerals 740A and 740B, respectively.

The method described above extends application of aggregation push-down strategy for cases when the aggregates in Select List and/or Group By columns involve expressions (instead of restricting it for cases when they are simple columns). This will improve the performance of SQL queries by leveraging the run-length encoding in compressed column partitions of grouping columns.

Aggregate Columns are Compressed

The above describes enabling pushdown aggregation for complex aggregate queries by leveraging the run-length encoding in compressed column partitions of grouping columns. This methodology can be applied to the run-length encoding in compressed column partitions of aggregate columns for the cases when there is no grouping specified, or for a given repeat-count chunk of the grouping field.

In bulk aggregation on a columnar table, the concepts of in-memory techniques are incorporated to fetch the column values from the columnar table. According to this, a fixed chunk of values of a CP column is fetched at a time and stored in a buffer. A chunk size of 256 values is assumed throughout this document, unless specified. The current aggregation implementation extracts each of these 256 values for each aggregation operation, which seems to be prudent when using a repeat-count of that aggregate field.

The discussion to this point has described the run-length compression technique on a column partitioned table. However, the same processes can be applied to column partitions compressed using Value List Compression (VLC) or Presence, Delta on Mean (PDM) compression techniques. In the case of VLC, this method of aggregation is performed by altering the way in which the repeat-count is computed. The added advantage for VLC compression technique is that the number of times decompression is applied to the indexed values is reduced by the factor of repeat-count. This technique is applicable for Parquet tables, an open source, column-oriented data file format for fast analytical querying as well. Whereas in the case of PDM, a combination of Delta on Mean techniques specific to Teradata Corporation, the SUM computation can be as simple as multiplying the mean of a container with the number of rows in the container.

The words run-length (RL) and repeat-count (RC) are used interchangeably in this document. For example, consider the below data distribution of a CP table, T. The table contains ten rows to keep the discussion simple.

| A | B |
|---|---|
| 1 | 5 |
| 1 | 5 |
| 1 | 5 |
| 1 | 5 |
| 1 | 5 |
| 1 | 5 |
| 2 | 5 |
| 2 | 5 |
| 2 | 5 |
| 2 | 5 |

Consider the following query for the above table:
SEL SUM(A) FROM T GROUP BY B;
Column B has a value of 5 with 10 RC, column A has value 1 with 6 RC and value 2 with 4 RC. In this case, SUM(A) can be now computed as:

$$Value1*RC1+Value2*RC2$$

That is, instead of calculating SUM(A) as 1+1+1+1+1+1+2+2+2+2, SUM(A) is calculated as 1*6+2*4.

There are situations when using an in-memory buffer when there are missing column values from disqualified rows. The rows can be disqualified when they are either filtered through a predicate in the query or if that row is updated/deleted in the CP table. These missing column values from disqualified rows are henceforth referred to as "holes" in this document. Based on this, the usage of run-length with the in-memory buffer can be classified into two cases:
1. No holes in in-memory buffer: The query does not have any predicates (without WHERE clause), the table did not undergo any deletes or updates.

2. Holes in in-memory buffer: The query has predicates, or columnar source table has undergone deletes or updates without recovering the space (not in-place delete/update).

These two cases are described below in detail. For simplicity, assume compute for SUM aggregate for a single group.

Figure 8:
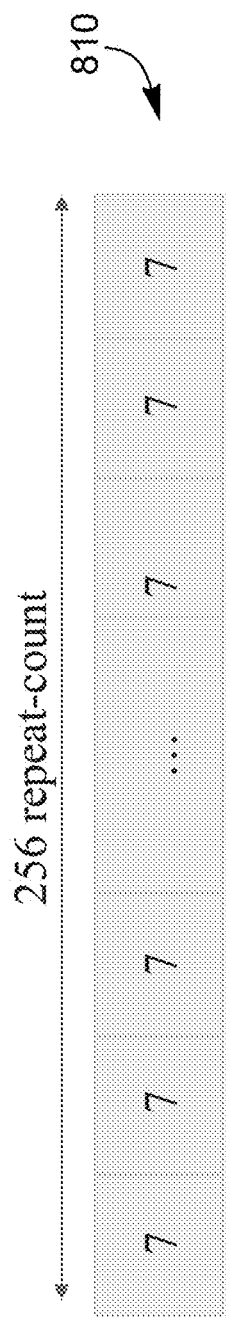
FIG. 8 is an example of an in-memory buffer populated entirely with a single column-value.
Figure 9:
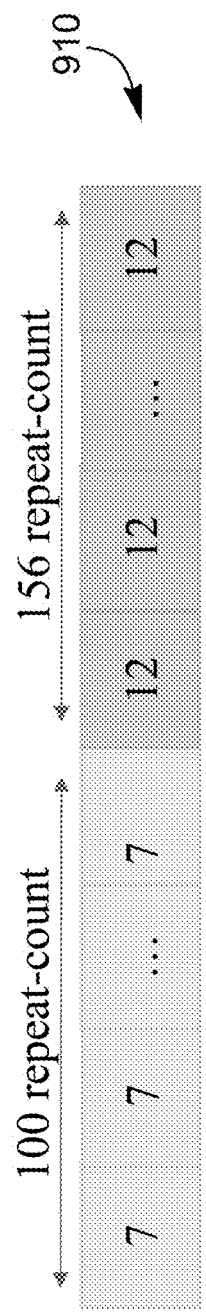
FIG. 9 is an example of an in-memory buffer populated with two different column values.

Case 1—without Holes in In-Memory Buffer:

This case is applicable in scenarios where a query does not have any predicates which filter out rows based on constraints, or a table did not undergo delete/updates. This case can be further classified into two categories:

1. Entire in-memory chunk has same value: This can be candidly done by multiplying the column value by the RC value 256. In the example shown in FIG. 8, the entire in-memory buffer 810 is populated with the column value "7" and the aggregate can be calculated as 256*7. This can be considered as a best-case scenario.
2. The in-memory chunk has different values: In-memory operation, in general, supports RL aware read when reading the values into an in-memory buffer. The operation keeps track of the run-length of the values in the buffer. For example, in the illustration shown as FIG. 9, memory buffer 910 contains the value 7 repeated 100 times, followed by the value 12 for the remaining 156 times. Then, with RL aware read, the RC of 100 at 0th index for value 7, and the RC of 156 at 99th index for value 12 is saved. The in-memory buffer is traversed, not sequentially, but by jumping to the indices based on repeat-counts, first checking the value at 0th index and its repeat-count (value: 7, RC: 100), then proceeding to 99th index and get the value and its repeat-count (value: 12, RC: 156). With this kind of RL aware reads, the compute of SUM aggregation can be simplified/optimized in this way—7*100+12*156. This can be further extended to any number of unique values in the 256 chunk of the in-memory buffer.

Figure 10:
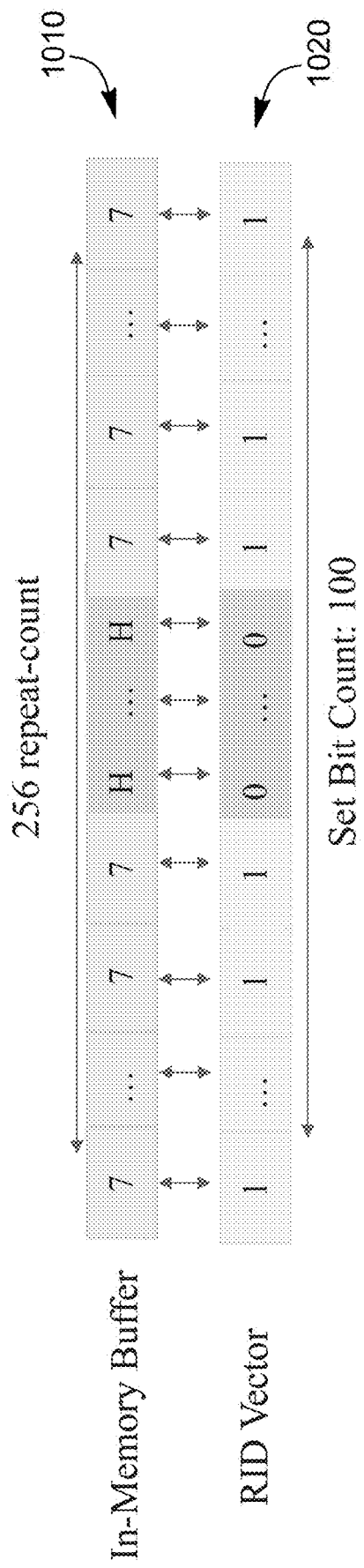
FIG. 10 is an example of an in-memory buffer populated with a single column value and a number of missing values.
Figure 11:
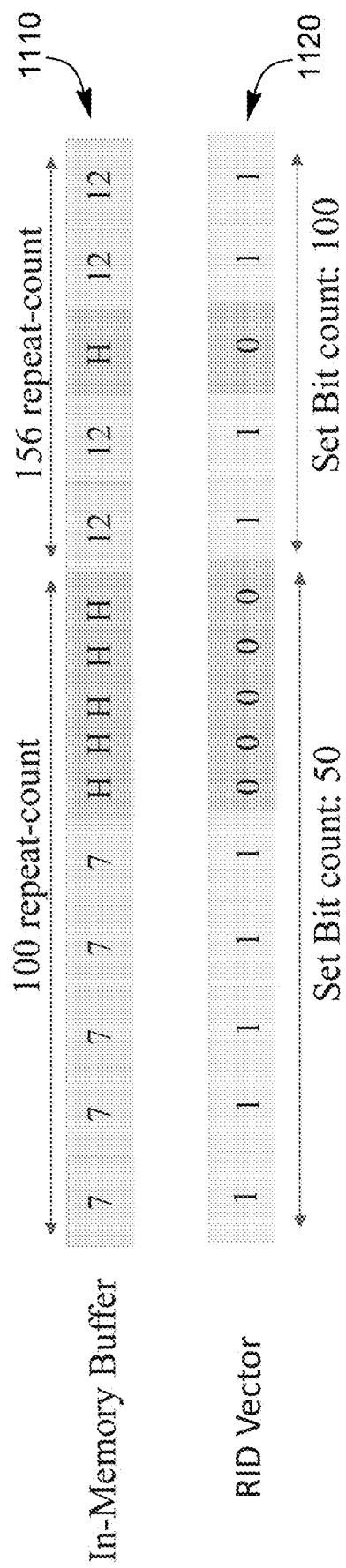
FIG. 11 is an example of an in-memory buffer and a corresponding Row Identification (RID) vector, the memory buffer populated with two different column values and several missing values.

Case 2—with Holes in In-Memory Buffer:

This case arises for a query with predicates or when delete/updates are performed on a CP table. The RID vector of the in-memory buffer, (that represents the Row IDs that were processed in bulk, can be used to identify these holes. The RID vector has reset bits (zeroes) to identify holes. In such cases, the idea is to determine the number of set bits in the RID vector, with the help of optimized vector processing or SIMD scan-like operations, and use set bits as RC wherever applicable. This scenario can be further classified into two cases:

1. Entire in-memory chunk has same value with holes in it: In this case, illustrated in FIG. 10, the in-memory buffer 1010 is populated with the column value "7" but contains holes—a number of missing values represented by the value "H". A count of the set bits in the RID vector 1120 can be used as RC. For example, if the SET BIT COUNT in RID vector for the entire chunk is 100, then the SUM can be computed as 7*100.
2. In-memory chunk has different values with holes in it: FIG. 11 shows a data distribution of the in-memory buffer 1110 and its RID vector 1120 where the memory chunk has different values with holes in it. The data distribution illustrated has two different values, 7 and 12, with corresponding RCs of 100 and 156. Because of the predicate in the query, there are some holes, represented by the value H, in the in-memory buffer. Based on the RC of a particular value, its equivalent length of RID vector is considered to compute the number of set bits. In this case, for value 7 with RC of 100, the RID vector's SET BIT COUNT is 50 (has 50 reset bits). Similarly, for value 12 with RC of 156, the RID vector's SET BIT COUNT is 100 (has 56 reset bits).

For cases like this, the minimum of RC and the SET BIT COUNT of RID vector are considered to compute the aggregates. The SUM aggregate calculation for the data distribution shown in FIG. 12 will be as follows: Value1*MIN(RC1, RID-count1)+Value2*MIN(RC2, RID-count2) ⇒7*MIN(100, 50)+12*MIN(156,100) ⇒7*50+12*100

With an understanding of how to use the compression of aggregate columns for simple aggregate queries, a discussion of the application of this same technique for aggregate expression queries follows. Consider the below simple query and data distribution of a table T:

| SELECT SUM(C + D) FROM T; | |
| --- | --- |
| C | D |
| 1 (3) | 4 (6) |
| 1 (2) | 4 (5) |
| 1 (1) | 4 (4) |
| 2 (2) | 4 (3) |
| 2 (1) | 4 (2) |
| 6 (5) | 4 (1) |
| 6 (4) | 3 (4) |
| 6 (3) | 3 (3) |
| 6 (2) | 3 (2) |
| 6 (1) | 3 (1) |

Traditionally, in this scenario the expression evaluation will be done for each row. However, utilizing an effective repeat count (EffRC) can reduce the number of expression evaluation and aggregate computations. EffRC is computed by considering the minimum of two repeat counts (of C and D columns). The SUM will now be computed as:

$$SUM(C + D) = (1 + 4) * \text{Min}(3, 6) + (2 + 4) * \text{Min}(2, 3) + (6 + 4) * \text{Min}(5, 1) + (6 + 2) * \text{Min}(4, 4)$$
$$= (1 + 4) * 3 + (2 + 4) * 2 + (6 + 4) * 1 + (6 + 2) * 4$$

Figure 12:
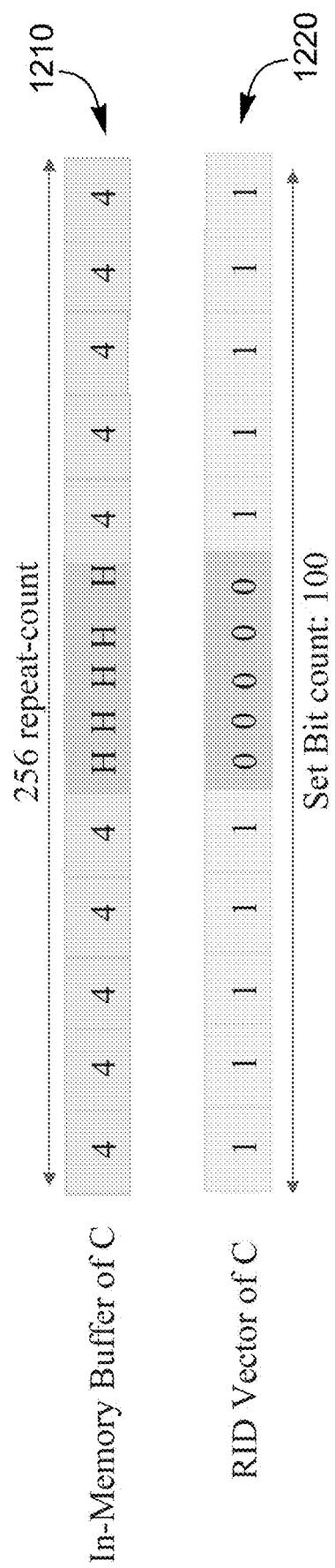
FIG. 12 and FIG. 13, is an example first and second memory buffers and corresponding RID vectors, respectively, used when evaluating a query aggregation expression involving values drawn from two column partitions.
Figure 13:
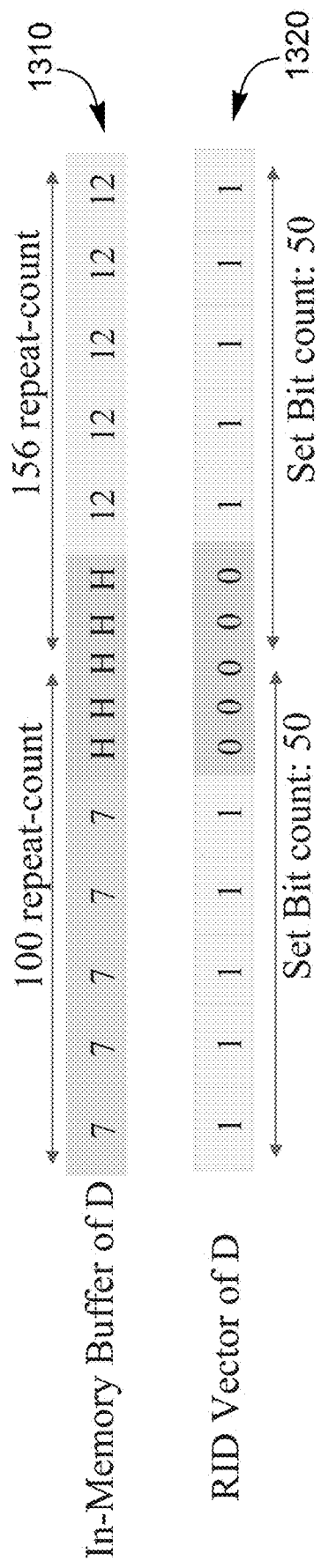

FIG. 12 and FIG. 13 are used to illustrate application of this technique at the level of in-memory buffer. The memory buffer 1210 (with holes) and RID Vector 1220 of column C, is illustrated in FIG. 12; and the memory buffer 1310 (with holes) and RID Vector 1320 of column D is illustrated in 13. In column C, the value 4 has a RC of 256, but the SET BIT COUNT is 100. Similarly, column D has values 7 and 12, with RCs of 100 and 156, and SET BIT COUNTs of 50 and 50 respectively.

In this scenario the SUM is computed as:

$$SUM(C + D) = (4 + 7) * \text{Min}(100, 50) + (4 + 12) * \text{Min}(50, 50)$$
$$(4 + 7) * 50 + (4 + 12) * 50$$

The above discussed aggregation technique can be generalized for SUM, MIN, MAX, and COUNT for different compression techniques. Aggregation procedures carried out when there are aggregations over expressions can also be considered.

1. SUM: The below generic formula can be used to compute the SUM:

$$\sum_{i=1}^{n}(V_i * \min(RC_i, RTDC_i))$$

Where 'n' is the maximum number of unique values in the in-memory buffer, T represents the current unique value under consideration, 'Vi' is the $i^{th}$ unique field/column value, '$RC_i$' is the repeat-count of the $i^{th}$ value and $RIDC_i$ is the RID vector's SET BIT COUNT.

In the above formula, for the case when there are no holes in the in-memory buffer the $RC_i$ and $RIDC_i$ are equal. Hence the above formula can be re-written as below for the scenario.

$$\sum_{i=1}^{n}(V_i * RC_i)$$

2. MIN/MAX: The computation of MIN/MAX can be done as below:

$MIN_i = MINIMUM(MIN_{i-1}, V_i)$ $MAX_i = MAXIMUM(MAX_{i-1}, V_i)$

Where T represents the current unique value under consideration and its value ranges from 1 to n (maximum number of unique values in the buffer). $MIN_0$ and $MAX_0$ are the initial values. $MIN_n/MAX_n$ will give the final MIN/MAX value.

3. COUNT: To compute COUNT, we can use the below generalized formula:

$$\sum_{i=1}^{n}\min(RC_i, RIDC_i)$$

4. Aggregates with expressions: For example, consider the below query with aggregation on expression. In this, the columns 'A' and 'B' are compressed.

SEL SUM(A*B) FROM T GROUP BY C;

To leverage compression information while computing aggregation, we compute the effective RC which is the minimum of the repeat-counts of 'A' and 'B'. Using this effective repeat-counts we compute the aggregations like mentioned above. This further reduces the aggregation evaluation by the factor of effective repeat-count.

Hence in the SUM/MIN/MAX/COUNT computations there is no need to traverse through the entire in-memory buffer as we leverage the compression information to skip all the duplicate fields. The formulae mentioned above are being applied on a single in-memory buffer, but this process must be repeated for all the values across the containers.

In case of expressions within aggregation where the underlying aggregate columns are compressed, the executable code needs to be executed only once for the effective repeat-count of the aggregate and grouping columns.

In case of VLC, the Repeat-count (contiguous or non-contiguous) can be computed on the fly for unique value in the in-memory chunk and then the formula as that for RLE can be applied. And, the indexed values in the in-memory buffer can be decompressed only once and then can be used to compute the aggregation.

The idea can be extended to scenarios where we have in-memory buffers with column values already read ahead, which will enable calculating the effective run-length when the in-memory buffers hold values from grouping columns. This way the same idea be extended to Group By columns that are Value-list compressed also.

The idea proposed here extends application of aggregation push-down strategy for cases when the aggregates in Select List and/or Group By columns involve expressions (instead of restricting it for cases when they are simple columns). This will help SQL queries to perform better by leveraging the run-length encoding in compressed column partitions of grouping columns as well as the aggregate columns.

What is claimed is:

1. A computer-implemented method, comprising:
executing a relational database management system (RDBMS) in a computer system, wherein:
the RDBMS manages a relational database comprising a data storage facility, and at least one column-partitioned base table within said data storage facility storing data;
receiving, by said RDBMS, an aggregation query for execution by said RDBMS, said query containing a SELECT statement including an aggregation expression referencing column values within multiple columns within said table;
generating, by said RDBMS, executable code for said query, said executable code including an executable code chunk for evaluating said aggregation expression, and an executable code chunk for performing aggregation;
executing, by said RDBMS, said executable code chunk for evaluating said aggregation expression to generate an intermediate, partially aggregated result set; and
executing, within said data storage facility using push-down aggregation techniques on said intermediate result set, said executable code chunk for performing aggregation on the intermediate, partially aggregated result set to generate a final result for said query.

2. The computer-implemented method according to claim 1, wherein:
said column-partitioned base table comprises a Parquet table.

3. The computer-implemented method according to claim 1, wherein:
said aggregation query for execution by said RDBMS contains multiple SELECT statements, at least one of said statements including an aggregation expression referencing column values within multiple columns within said table;
said executable code includes executable code chunks for evaluating each aggregation expression contained within query; and
additional aggregates in the SELECT statements are evaluated using push-down aggregation techniques.

4. The computer-implemented method according to claim 3, wherein said multiple columns within said table are compressed columns.

5. The computer-implemented method according to claim 4, wherein:
said executable code chunks for performing aggregations for each of said multiple SELECT statements use push-down aggregation techniques to aggregate values stored within said compressed columns.

6. The computer-implemented method according to claim 1, wherein:
   said aggregation query for execution by said RDBMS contains a GROUP-BY clause.

7. The computer-implemented method according to claim 6, wherein:
   said GROUP-BY clause references a column within said table which is compressed.

8. The computer-implemented method according to claim 7, wherein:
   said GROUP-BY clause references a column within said table which is compressed using run length encoding.

9. The computer-implemented method according to claim 7, wherein:
   said GROUP-BY clause references a column within said table which is compressed using value list compression.

10. The computer-implemented method according to claim 1, wherein said step of evaluating said aggregation expression to generate an intermediate result set includes the steps of:
   reading said column values from said multiple columns referenced in said aggregation expression to system memory; and
   evaluating said aggregation expression to generate said intermediate result set is performed against said column values contained in said system memory.

11. The computer-implemented method according to claim 1, wherein said SELECT statement comprises one of the following statements: AVG, COUNT, MIN, MAX and SUM.

12. A computer-implemented method, comprising:
   executing a relational database management system (RDBMS) in a computer system, wherein:
   the RDBMS manages a relational database comprising a data storage facility, and at least one column-partitioned base table within said data storage facility storing data;
   receiving, by said RDBMS, an aggregation query for execution by said RDBMS, said query containing a GROUP-BY clause containing references to multiple fields within said table;
   generating, by said RDBMS, executable code for said query, said executable code including an executable code chunk for evaluating said GROUP-BY clause, and an executable code chunk for performing aggregation;
   executing, by said RDBMS, said executable code chunk for evaluating said GROUP-BY clause to generate a hash for said multiple grouping fields, and using said hash to generate an intermediate, partially aggregated result set; and
   executing, within said data storage facility using pushdown aggregation techniques, said executable code chunk for performing aggregation on the intermediate, partially aggregated result set to generate a final result for said query.

13. A computer-implemented method, comprising:
   executing a relational database management system (RDBMS) in a computer system, wherein:
   the RDBMS manages a relational database comprising a data storage facility, and at least one column-partitioned base table within said data storage facility storing data;
   receiving, by said RDBMS, an aggregation query for execution by said RDBMS, said query containing a GROUP-BY clause containing an expression involving multiple fields within said table;
   generating, by said RDBMS, executable code for said query, said executable code including an executable code chunk for evaluating said expression, and an executable code chunk for performing aggregation;
   executing, by said RDBMS, said executable code chunk for evaluating said expression to generate a set of GROUP-BY values, and using said set of GROUP-BY values to generate an intermediate, partially aggregated result set; and
   executing, within said data storage facility using pushdown aggregation techniques, said executable code chunk for performing aggregation on the intermediate, partially aggregated result set to generate a final result for said query.

14. A computer-implemented method, comprising:
   executing a relational database management system (RDBMS) in a computer system, wherein:
   the RDBMS manages a relational database comprising a data storage facility, and at least one column-partitioned base table within said data storage facility storing data;
   receiving, by said RDBMS, an aggregation query for execution by said RDBMS, said query containing at least one SELECT statement referencing column values within a compressed column within said table;
   generating, by said RDBMS, executable code for said query, said executable code including an executable code chunk for evaluating said compressed values from said compressed column, and an executable code chunk for performing aggregation;
   executing said executable code chunk for evaluating said compressed values from said compressed column to generate an intermediate, partially aggregated result set; and
   executing, within said data storage facility using pushdown aggregation techniques, said executable code chunk for performing aggregation on the intermediate, partially aggregated result set and generate a final result for said aggregation.

15. The computer-implemented method according to claim 14, wherein:
   said step of executing said executable code chunk for evaluating said compressed values from said compressed column includes the steps of:
   reading said column values from said compressed column to system memory; and
   executing said executable code chunk for evaluating said compressed values from said compressed column is performed against said column values contained in said system memory.

16. The computer-implemented method according to claim 15, wherein said intermediate, partially aggregated result set is written to system memory.

17. The computer-implemented method according to claim 14, wherein:
   said aggregation query for execution by said RDBMS comprises an aggregation query without a GROUP-BY clause.

18. The computer-implemented method according to claim 14, wherein:
   said aggregation query for execution by said RDBMS contains a GROUP-BY clause where the grouping columns are also compressed.

19. The computer-implemented method according to claim 14, wherein:

said aggregation query for execution by said RDBMS contains a predicate.

\* \* \* \* \*